(12) United States Patent
Xu (10) Patent No.: US 7,843,949 B2
(45) Date of Patent: Nov. 30, 2010

(54) COMMUNICATION APPARATUS AND METHOD WITH CHANGING COMPOSITION OF A VECTORED GROUP

(75) Inventor: Wen Xu, Neubiberg (DE)

(73) Assignee: Lantiq Deutschland GmbH, Neubiberg (DE)

(*) Notice: Subject to any disclaimer, the term of this patent is extended or adjusted under 35 U.S.C. 154(b) by 427 days.

(21) Appl. No.: 11/840,701

(22) Filed: Aug. 17, 2007

(65) Prior Publication Data
US 2009/0046568 A1 Feb. 19, 2009

(51) Int. Cl.
*H04L 12/28* (2006.01)
(52) U.S. Cl. ..................................................... 370/401
(58) Field of Classification Search ................ 370/401, 370/351, 389, 400; 375/316, 319, 320, 346
See application file for complete search history.

(56) References Cited

U.S. PATENT DOCUMENTS

| | | | |
|---|---|---|---|
| 6,987,800 | B2 | 1/2006 | Nordström et al. |
| 7,023,908 | B2 | 4/2006 | Nordstrom et al. |
| 7,548,599 | B2* | 6/2009 | Azadet ........................ 375/350 |
| 2003/0072380 | A1* | 4/2003 | Huang ........................ 375/261 |
| 2004/0136463 | A1* | 7/2004 | Tzannes ..................... 375/257 |
| 2004/0146002 | A1* | 7/2004 | Azadet ........................ 370/201 |
| 2006/0274893 | A1 | 12/2006 | Cioffi et al. |
| 2007/0047631 | A1 | 3/2007 | Bostoen et al. |
| 2007/0133723 | A1 | 6/2007 | Cheong et al. |

FOREIGN PATENT DOCUMENTS
WO WO 2005089064 A2 * 9/2005

OTHER PUBLICATIONS

Lee et al, Band-Preference Dynamic Spectrum Management in DSL Environment, Global Communication Conference, Nov. 27-Dec. 1, 2006, pp. 1-5.*
Leshem, A., et al., "A Low Complexity Coordinated FEXT Cancellation for VDSL," 2004 11th IEEE International Conference on Electronics, Circuits and Systems, Dec. 13-15, 2004, pp. 338-341, IEEE.
Cendrillon, R., et al., "The Linear Zero-Forcing Crosstalk Canceler is Near-optimal in DSL Channels," Global Telecommunications Conference, 2004, Nov. 29-Dec. 3, 2004, pp. 2334-2338, vol. 4, IEEE.
Assia Inc., "G.PLOAM, G.ADSL, G.VDSL—Overview of technologies for vectored DSL," Study Group 15, Jun. 12-16, 2006, 8 pages, ITU-Telecommunication Standardization Sector, Ghent, Belgium.

(Continued)

*Primary Examiner*—Pankaj Kumar
*Assistant Examiner*—Gautam Sharma
(74) *Attorney, Agent, or Firm*—Slater & Matsil, L.L.P.

(57) ABSTRACT

In an embodiment, a method for crosstalk reduction includes reducing crosstalk of a group of communication channels based on crosstalk reduction parameters. The method also changes a composition of the group of communication channels, which includes including at least one additional communication channel to the group, removing at least one communication channel from the group or exchanging at least one communication channel of the group for at least one communication channel not in the group. Crosstalk reduction parameters are calculated after the change of composition based on crosstalk reduction parameters before the change of composition.

32 Claims, 2 Drawing Sheets

OTHER PUBLICATIONS

Editor DSM Technical Report, "Second Letter Ballot Draft of the DSM Technical Report," Project: 50, Dynamic Spectral Management, Feb. 12-15, 2007, 96 pages, ATIS, Nashville, TN, USA.

Actelis Networks, "Implementation of the "Abuse of Receivers" method for FEXT Cancellation," ATIS Network Interface, Power & Protection Committee, Subcommittee Network Access Interfaces, Feb. 12-15, 2007, 9 pages, ATIS, Nashville, TN, USA.

Duvaut, P., et al., "Adaptive Off-Diagonal MIMO Pre-coder (ODMP) for Downstream DSL Self FEXT Cancellation," Apr. 10, 2007, 4 pages, Conexant Systems, Inc., Red Bank, NJ, USA.

Conexant Systems, Inc., "G. vdsl: Answers to questions and concerns related to reporting the error(f) for self FEXT cancellation," Study Group 15, Apr. 16-20, 2007, 6 pages, Conexant Systems, Inc., Napa Valley, CA, USA.

Verlinden, J., et al., "Dynamic Spectrum Management for Digital Subscriber Lines," Technology White Paper, Jun. 2005, 12 Pages, Edition 2, Alcatel, http://www1.alcatel-lucent.com/com/en/appcontent/apl/T0605_DSM_ed02-EN_tcm172-282671635.pdf.

Telecommunication Standardization Sector of ITU, "Very High Speed Digital Subscriber Line Transceivers 2 (VDSL2)," Series G: Transmission Systems and Media, Digital Systems and Networks, International Telecommunication Union, Feb. 2006, 252 Pages, G.993.2, http://www.itu.int/rec/T-REC-G.993.2-200602-I/en.

Ek, M., et al., "G. vdsl2: Pilot Sequence Assisted Vector Channel Estimation," International Telecommunication Union; Oct. 2006, 6 Pages, Study Group 15-Contribution 177.

Telecommunication Standardization Sector of ITU, "Handshake Procedures for Digital Subscriber Line (DSL) Transceivers," Series G: Transmission Systems and Media, Digital Systems and Networks, International Telecommunication Union, Feb. 2007, 848 Pages, G.994.1, http://www.itu.int/rec/T-REC-G.994.1-200702-I/en.

Van Der Putten, F., "G. Vector: Draft Text for Recommendation G. Vector," International Telecommunication Union, Feb. 2008, 14 Pages.

Van Bruyssel, D., et al., "G. Vector: Fast Seamless Joining Via CPE Correlation of Joining Signature Sequence," International Standardization Sector, Apr. 2008, 6 Pages.

* cited by examiner

COMMUNICATION APPARATUS AND METHOD WITH CHANGING COMPOSITION OF A VECTORED GROUP

BACKGROUND

In a multiuser communication system, crosstalk is a phenomenon having a negative impact on the capability of a system, for example, on a data rate, transmission quality and the like. One type of crosstalk is far end crosstalk which occurs between communication channels influencing each other, for example, between a plurality of physical wired lines from a central office to different customers or in wireless communication systems.

An approach to reduce crosstalk is the vectoring, which involves a joined processing of a plurality of communication channels at a transmitter and/or a receiver depending on crosstalk reduction parameters. In some cases, depending on the computational power only a group of communication channels (so-called vectored group) selected from all communication channels used, is subjected to vectoring (so-called partial vectoring). In this case, channels may be added to the group or removed from the group.

In this case, crosstalk reduction parameters used for the above treatment have to be adapted. For this adaptation, in some cases inversions of large matrices are required which is computationally costly.

Furthermore, when channels are added to the group or removed from the group, the influence of crosstalk on communication via the communication channels may change. Therefore, a general need exists for effective updating of crosstalk reduction parameters and for possibilities of changing the composition of the vectored group while minimizing an increase of crosstalk influence.

SUMMARY OF THE INVENTION

In an embodiment, a method for crosstalk compensation is provided, comprising: at least partially reducing crosstalk of a group of communication channels based on crosstalk reduction parameters, changing a composition of the group of communication channels and calculation crosstalk reduction parameters after that change of composition based on crosstalk reduction parameters before the change of composition.

In a further embodiment, a method for crosstalk compensation is provided, comprising: at least partially reducing crosstalk of a group of communication channels, and basically simultaneously adding at least one communication channel to the group and removing at least one communication channel from the group.

In other embodiments, corresponding communication apparatuses are provided.

BRIEF DESCRIPTION OF THE DRAWINGS

For a more complete understanding of an embodiment of the present invention, and the advantages thereof, reference is now made to the following descriptions taken in conjunction with the accompanying drawings, in which.

DETAILED DESCRIPTION OF ILLUSTRATIVE EMBODIMENTS

In the following, exemplary embodiments of the present invention will be described in detail. It is to be understood that the following description is given only for the purpose of illustration and is not to be taken in a limiting sense. The scope of the invention is not intended to be limited by the exemplary embodiments shown in the drawings and described hereinafter.

It is also to be understood that in the following description of exemplary embodiments any direct connection or coupling between functional blocks, devices, components, circuit elements or other physical or functional units shown in the drawings or described herein could also be implemented by an indirect connection or coupling, i.e., a connection comprising additional intervening elements. Furthermore, connections shown may be implemented both by wire-based connections and by wireless connections in various embodiments. Furthermore, it should be appreciated that functional blocks or units shown in the drawings may be implemented as separate circuits in embodiments, but may also be fully or partially implemented in a common circuit in other embodiments.

It is to be understood that the features of the various exemplary embodiments described herein may be combined with each other unless specifically noted otherwise.

Figure 1:
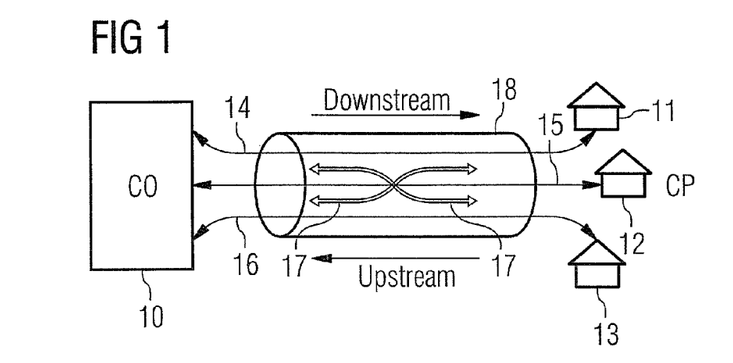
FIG. 1 shows a schematic diagram of a communication system according to an embodiment of the present invention.

In the following, embodiments of communication apparatuses and corresponding methods will be discussed. FIG. 1 shows a communication system according to an embodiment of the present invention.

The communication system according to the embodiment of FIG. 1 comprises a communication apparatus 10 communicating with a plurality of communication apparatuses 11, 12, 13 via a corresponding plurality of communication lines 14, 15 and 16. In an embodiment of the present invention, communication apparatus 10 is a central office equipment, i.e., is generally within the responsibility of a provider of communication services, while communication apparatuses 11, 12 and 13 are located in customer's premises (CP), for example, at sites of clients of the above-mentioned service provider.

It should be note that while three communication apparatuses 11, 12, 13 are shown in the embodiment of FIG. 1, these communication apparatuses are to be understood as representing any arbitrary number of communication apparatuses with which the communication apparatus 10 communicates.

In the embodiment of FIG. 1, communication lines 14, 15 and 16 are bidirectional lines. In another embodiment, communication lines 14, 15 and 16 may be unidirectional lines.

Communication lines 14, 15 and 16 may be wire-based communication lines, for example, twisted copper pairs as used for DSL (digital subscriber line) communication, for example, ADSL or VDSL communication. In another embodiment, communication lines 14, 15 and 16 represent wireless communication channels.

The communication direction from communication apparatus 10 to communication apparatuses 11 to 13 will be designated downstream direction and the communication direction from communication apparatuses 11 to 13 to communication apparatus 10 will be designated upstream direction in the following.

As indicated by arrows 17, crosstalk may occur between two or more of the communication lines 14, 15, 16, i.e., signals in one communication line may influence signals in another communication line. In case of wire-based communication, such crosstalk is more likely to occur between communication lines in a so-called binder 18 symbolized by a cylinder surrounding the communication lines in FIG. 1. In a binder, communication lines are close together, enhancing crosstalk. On the other hand, crosstalk may also occur between communication lines in different binders or between wireless communication channels.

Crosstalk as indicated by arrows 17 may occur both in an upstream direction and in a downstream direction.

In an embodiment, communication apparatus 10 comprises crosstalk reduction mechanisms for partially or fully compensating for the effects of crosstalk for some or all of the communication lines 14 to 16. While in an embodiment this crosstalk reduction is aimed at reducing crosstalk in all communication lines, in other embodiments crosstalk reduction is performed only for some of the communication lines. The selection of which lines are used for crosstalk reduction may be made based on the strength of crosstalk in the respective lines and the corresponding deterioration of communication capabilities, for example, bit rate, but may additionally or alternatively also be made depending on other factors, for example, a contract of a respective client which is connected with a central office via communication lines, like service standards in such a contract.

In an embodiment, the communication lines to which crosstalk reduction is applied may change over time. For example, when a communication line becomes inactive, it may be removed from the group of lines subjected to crosstalk reduction, if crosstalk influence in lines change, lines in the groups may be exchanged with lines outside the group, etc. In an embodiment, the respective crosstalk reduction mechanisms in communication apparatus 10 are adapted accordingly.

Embodiments of communication apparatuses employing such crosstalk reduction will be discussed in the following with reference to FIGS. 2 to 4. In the description of these embodiments, a system model will be used for describing crosstalk and crosstalk cancellation which will be explained first.

According to this model, communication over a channel may be described by:

$$Y_k = H_{k,k} X_k + \sum_{l \neq k} H_{k,l} X_l + Z_k \quad (1)$$

In equation (1), k is an index denoting a channel. $Y_k$ denotes a received symbol, $X_k$ denotes a transmitted symbol, and $Z_k$ denotes noise. For example, applied to the embodiment of FIG. 1 in a downstream direction, $Y_k$ denotes a symbol received by one of communication apparatuses 11, 12 and 13 (identified by k), $X_k$ denotes the corresponding symbol sent by communication apparatus 10, and $Z_k$ denotes the noise of the corresponding communication link 14, 15, 16. In upstream direction, $X_k$ correspondingly denotes any symbol sent by the communication apparatus 11, 12, 13 identified by k, $Y_k$ denotes the corresponding symbol received by communication apparatus 10, and $Z_k$ again denotes the noise on the respective communication channel. In other embodiments, other types of data units other than symbols may be used.

$H_{k,l}$ is a complex valued interference coupling factor describing the interference or crosstalk from channel l to channel k. Therefore, the second term on the right side of equation (1) represents the crosstalk or inter-user interference experienced by channel k from all the other channels l. Such a type of crosstalk is also known as far end crosstalk (FEXT).

In case of DSL systems, a channel may, for example, correspond to a metallic line $H_{k,l}$ may represent, for example, a cascade of inverse discrete Fourier transformations, digital to analog converter, transmit filter of channel l, the actual physical link and the receive filter, analog to digital converter and discrete Fourier transformation of channel k. In communication systems other than DSL systems, $H_{k,l}$ may represent, for example, modulation/demodulation circuits and the transmission channel of the respective users.

In case of DSL transmission, crosstalk occurs, for example, between metallic twisted pair lines in a binder, in which case $H_{k,l}$ represents the coupling coefficient for crosstalk from line l into line k.

In an embodiment, multi-frequency transmission techniques may be used for data transmission, i.e., data may be transmitted via a line for a user of the communication channel in a plurality of frequency ranges. An example of such a multifrequency transmission technique is discrete multitone modulation (DMT) which is, for example, used in some DSL transmission systems, the frequency ranges in DMT also being referred to as tones. In such an embodiment, in a case where no or only negligible cross-talk exists between different frequency ranges in different lines, equation (1) may be applied to each frequency range or tone separately. In an embodiment where crosstalk between different frequency ranges or tone should also be taken into account, each channel k in equation (1) has a specific frequency range. For example, in case of two users each using 100 different frequency ranges, k=0 . . . 99 may denote frequency ranges 0-99 of the first user, k=100 . . . 199 may denote frequency ranges 0-99 for the second user, and k=200 . . . 299 may denote frequency ranges 0-99 of the third user. Since, as can be seen from this example, equation (1) may easily be used both for the case of single frequency transmission techniques as well for multi-frequency transmission techniques, and the same holds true for the explanations and embodiments which will follow, for simplicity's sake and to provide an easier understanding of the embodiments which will be described in the following, k will be assumed to denote a user using a channel or link in the following, i.e., channel and user will be used in an interchangeable manner in the following. As explained above, the same equations may be used for the case where more than one channel, e.g., more than one frequency range, is assigned to a user.

As already mentioned, in embodiments a crosstalk reduction or cancellation is performed for some or all of the users of a communication system. The users for which crosstalk cancellation is performed will also be denoted vectored or corporative group in the following. At least initially, this group is assumed to have $K_0$ users. Using:

$$x = [X_0 \quad X_1 \quad \ldots \quad X_{K_0-1}]^T \quad (2)$$

$$y = [Y_0 \quad Y_1 \quad \ldots \quad Y_{K_0-1}]^T \quad (3)$$

$$z = [Z_0 \quad Z_1 \quad \ldots \quad Z_{K_0-1}]^T \quad (4)$$

wherein $(.)^T$ denotes transpose, and $$H = \begin{bmatrix} H_{0,0} & H_{0,1} & K & H_{0,K_0-1} \\ H_{1,0} & H_{1,1} & K & H_{1,K_0-1} \\ M & M & O & M \\ H_{K_0-1,0} & H_{K_0-1,1} & K & H_{K_0-1,K_0-1} \end{bmatrix} \quad (5)$$

equation (1) may, for all k, expressed in a vector form as:

$$y = Hx + z \quad (6)$$

Figure 2:
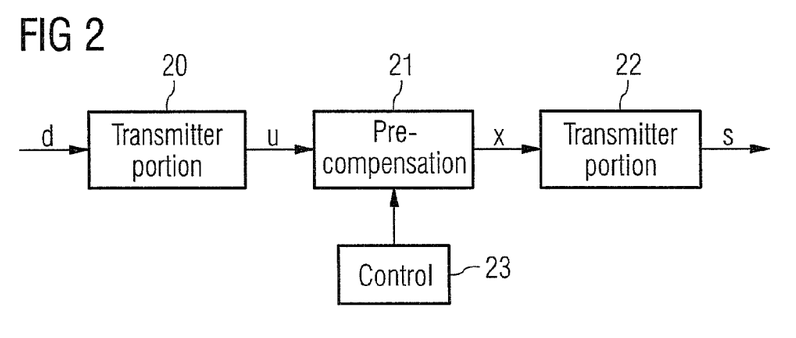
FIG. 2 shows a block diagram of a communication apparatus according to an embodiment of the present invention.

In FIG. 2, an embodiment of a communication apparatus using crosstalk reduction is schematically shown. The embodiment of FIG. 2 may, for example, be used in communication apparatus 10 of FIG. 1. However, the application of the embodiment of FIG. 2 is not limited to communication apparatus 10 of FIG. 1, but may be employed in general in cases where data is transmitted via a plurality of communication lines or communication channels and the transmission may be effected in a coordinated manner, for example, from a single location where information regarding all the transmissions is available or by a plurality of transmitters which can rapidly exchange information such that the transmission may be made in a coordinated manner.

In the embodiment of FIG. 2, data d to be transmitted via a plurality of lines is supplied to a first transmitter portion 20. First transmitter portion 20, depending on the transmission technique used, may comprise filters, modulators and other transmission circuitry to produce symbols $U_k$, for example, constellation points of a Trellis modulation or a quadrature amplitude modulation (QAM). These symbols for the plurality of users k may be written as a vector u according to:

$$u = [U_0 U_1 K\ U_{K_0-1}]^T \quad (7)$$

It should be noted that transmitter portion 20 may comprise separate circuitry for each user and/or may also comprise circuitry used by all users jointly.

Vector u, i.e., the information symbols of the users 0 ... $K_0-1$ of the vectored group, are fed to a precompensation unit 21 which calculates vector x of the transmitted symbols, x being defined as in equation (2), based on u. In an embodiment, precompensation unit 21 is a linear precompensator where the transmitted symbol $X_k$ of the k-th user is a linear combination of the information symbols U of all the users, i.e., $$x = Pu \quad (8)$$

wherein P denotes a K-by-K precompensation matrix.

However, in another embodiment a non-linear precompensation unit 21 may be used as well wherein x is determined based on u in a non-linear manner.

In an embodiment, precompensation matrix P may be written as:

$$P = H^{-1}D \quad (9)$$

(so-called zero-forcing equalizer) wherein $H^{-1}$ denotes the inverse matrix of H and D is any diagonal matrix with non-zero diagonal elements. In an embodiment, $D = \{H\}_d$, where $\{.\}_d$ denotes the operator selecting only the diagonal entries of its argument matrix, i.e., $$D = \{H\}_d = \begin{bmatrix} H_{0,0} & & & \\ & H_{1,1} & & \\ & & O & \\ & & & H_{K_0-1,K_0-1} \end{bmatrix} \quad (10)$$

$E = \{H\}_{nd}$, wherein $\{.\}_{nd}$ denotes an operator selecting only the non-diagonal entries of its argument, i.e., $$E = \{H\}_{nd} = \begin{bmatrix} 0 & H_{0,1} & K & H_{0,K_0-1} \\ H_{1,0} & 0 & K & H_{1,K_0-1} \\ M & M & O & M \\ H_{K_0-1,0} & H_{K_0-1,1} & K & 0 \end{bmatrix} \quad (11)$$

The matrix H of equation (5) can be written as:

$$H = D + E \quad (12)$$

The symbols X such obtained are then transmitted via the communication channels via a second transmitter portion 22, which may, for example, comprise inverse fast Fourier transformation circuits, output amplifiers and the like to generate transmission signals s transmitted via the communication channels. As already indicated, in the system model used for describing the system the effect of transmitter portion 22 are comprised in the matrix H, for example in the diagonal elements thereof.

Combining equations (6), (8) and (9), at the receiver symbols y are received according to:

$$y = Du + z \quad (13)$$

or equivalently:

$$Y_k = H_{k,k} U_k + Z_k \quad (14)$$

As can be seen from equations (13) and (14), in an embodiment which uses a precompensation matrix as defined by equation (9), the receive signal does not comprise far end crosstalk, i.e., crosstalk generated by transmission in various lines in the same direction, as described by equation (1). It should be noted that other types of crosstalk like so called near end crosstalk may still be present, and/or additional measures may be taken against such types of crosstalk in embodiments.

The communication apparatus according to the embodiment of FIG. 2 furthermore comprises a control unit 23 which determines and modifies precompensation matrix P. At the start up of the system, precompensation matrix P in an embodiment is calculated according to equation (9). In an embodiment, to this end matrix H is determined, for example, by transmitting and analyzing test sequences or other known data like pilot symbols over the various communication links (so-called channel estimation).

During operation, using, for example, so called channel tracking matrix P is adjusted to changes in the properties of the communication lines, in particular to changes of the crosstalk therebetween, e.g., by using so-called channel tracking.

Furthermore, control unit 23 adapts precompensation matrix P in case users join or leave the vectored group or users in the vectored group are exchanged as mentioned above. Embodiments for adapting precompensation matrix P in such cases will be described in detail later.

It should be noted that matrix H may be the same for upstream and downstream direction, but in other embodiments also separate matrixes H may be used to describe crosstalk for the two transmission directions separately.

The embodiment of FIG. 2 uses a precompensation unit 21 which modifies data to be transmitted via two transmissions for reducing the effects of crosstalk. In FIG. 3, a further embodiment of a communication apparatus according to the present invention is schematically shown which operates on the received symbols, i.e., on the data which already has experienced crosstalk, for reducing crosstalk. The communication apparatus of the embodiment of FIG. 3 may, for example, be employed in a receiver portion of communication apparatus 10 of the embodiment of FIG. 1 to process data received from communication apparatuses 11 to 13. In general, the communication apparatus of the embodiment of FIG. 3 may be employed in situations where a joint or coordinated processing of data received via a plurality of channels is possible.

Figure 3:
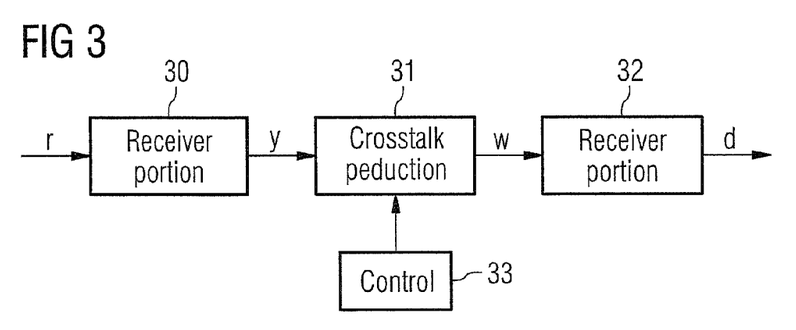
FIG. 3 shows a further communication apparatus according to an embodiment of the present invention.

In the embodiment of FIG. 3, data symbols r are received via a plurality of communication channels and processed in a first receiver portion 30. First receiver portion 30 may comprise elements like receive filters, amplifiers, fast Fourier transformation circuits and the like and outputs received symbols $Y_k$ which according to equation (3) may be written in a vector y. Similar to second transmitter portions 22, the effects of first receiver portion 30 in the system model used for describing the communication system are incorporated in matrix H. The symbols y in the embodiment of FIG. 3 are then fed to a crosstalk cancellation unit 31. Crosstalk cancellation unit 31 calculates information symbols $W_k$ for each user k in the vectored group, said information symbols Wk also being written as:

$$W=[W_0 W_1 K W_{K_0-1}]^T \qquad (15)$$

based on y. In an embodiment, crosstalk cancellation unit 31 is a linear crosstalk cancellation unit calculating w according to:

$$w=Cy \qquad (16)$$

wherein C is a $K_0$ by $K_0$ crosstalk cancellation matrix.

In an embodiment, C is calculated according to:

$$C=H^{-1} \qquad (17)$$

This calculation may be performed by a control unit 33 in the embodiment of FIG. 3, wherein control unit 33, for example, at the initialization of the communication determines H, for example, using channel estimation. In this case, combining equations (2), (15) and (16) yields:

$$w=Cy=x+H^{-1}z \qquad (18)$$

As can be seen, in this case the effects of crosstalk described by matrix H are basically completely eliminated, and noise z is modified becoming $H^{-1}z$. Depending on the channel matrix H, this may lead to enhancement of noise.

The crosstalk cancellation matrix of equation (16) corresponds to a so called zero forcing linear equalizer, similar to the precompensation matrix defined in equation (9). In other embodiments, other types of equalizers, both linear equalizers and non-linear equalizers, may be used, for example, DFE (decision feedback equalizers) or MMSE (minimum mean square error) equalizers. For example, the minimum mean square error equalizer minimized the mean square difference between the channel input and output of the crosstalk cancellation unit 31 to achieve a compromise between cancellation of crosstalk and noise enhancement. In this case, the crosstalk cancellation matrix C may be written as:

$$C = H^*\left(HH^* + \frac{\sigma_Z^2}{\sigma_X^2}I\right)^{-1} \qquad (19)$$

wherein $\sigma_X^2$, $\sigma_Z^2$ denote the spectrum density of the transmitted symbol X and of the additive noise Z, respectively. H* denotes the conjugate transpose of H.

In the embodiment of FIG. 3, information symbols W are fed to a second receiver portion 32 which, for example, may comprise demodulation circuitry to obtain receive data d from the information symbols w. Second receiver portion 32 in an embodiment may be implemented as separate circuits for each user, and in another embodiment may fully or partially be implemented as joined circuitry for some or all communication lines.

In the embodiment of FIG. 3, control unit 33 is adapted to adjust crosstalk cancellation matrix C during use and/or to adapt matrix C to changes of the users of the vectored group, for example, users leaving the group, users joining the group or an exchange of users in the group, which will be explained later in greater detail.

In some of the embodiments described above, matrix inversions are necessary, for example, inversions of the matrix H as in the embodiments defined by equations (9) or (17). In some communication systems, for example, some DSL applications, the matrix H is columnwise and rowwise diagonally dominant, i.e., without a column or within a row of the matrix, the magnitudes of the diagonal elements are much larger than those of the off-diagonal elements. In such cases, in an embodiment the inversion of the matrix $H^{-1}$ is replaced by an approximation, for example, a first order approximation according to:

$$H^{-1} = (D(I + D^{-1}E))^{-1} \qquad (20)$$
$$\approx (I - D^{-1}E)D^{-1}$$

In this case, the crosstalk cancellation matrix C and the precompensation matrix P may be written as:

$$C=H^{-1}\approx(I-D^{-1}E)D^{-1} \qquad (21)$$

$$P=H^{-1}D\approx I-D^{-1}E \qquad (22)$$

In this case, compared with a full matrix inversion the computational complexity is reduced, but the crosstalk is not cancelled completely as in equations (13) and (18). The computational complexity is also determined by the size of the matrix H, i.e., the number of users in the vectored group. Therefore, the full inversion or the approximation of equation (20) in an embodiment may be used depending on the computational power available, the quality of crosstalk reduction required and/or the number of users in a vectored group.

As already mentioned, while in embodiments all communication channels, i.e., all users, are in the vectored group, in which case, for example, the precompensation of the embodiment of FIG. 2 and/or the crosstalk cancellation of the embodiment of FIG. 3 is performed for all users, in other embodiments only some of the users may be part of the vectored group, for example, users or channels experiencing or causing the greatest crosstalk, users or channels with respective service conditions and the like. In case of multifrequency transmission techniques, also only some frequency ranges of a given line or user may be part of the vectored group, whereas other frequency ranges are not. In case the frequency ranges do not influence each other, i.e., the frequency ranges are treated separately, the choice of users may be different for each frequency range. As already mentioned, in such cases in the embodiment of FIGS. 2 and 3 control units 23 and 33, respectively, adapt precompensation unit 21 in crosstalk cancellation unit 31, respectively, depending on users joining the vectored group, users leaving the vectored and/or a user exchange in the vectored group, the latter being a combination of joining and leaving. For example, when a line is dropped, i.e., temporarily put out of use, in an embodiment the respective user is decoupled from the vectored group as an unused line usually causes little or no crosstalk. In an embodiment, crosstalk reduction parameters like precompensation matrix P, crosstalk cancellation matrix C and the like after a user change are calculated based on the respective crosstalk reduction parameters after the user change.

The above situations are of one or more users leaving the vectored group, one or more users joining the vectored group and an exchange of one or more users in the vectored group will be commonly referred to as user change events in the following. Furthermore, precompensation performed on a transmitter side as, for example, performed in precompensation unit 21 of the embodiment of FIG. 2 and crosstalk cancellation as performed on a receiver side, for example, in crosstalk cancellation unit 31 of FIG. 3, will be commonly referred to as crosstalk reduction. The respective parameters used, for example, precompensation matrix P and crosstalk cancellation matrix C in case of linear crosstalk cancellation will be commonly referred to as crosstalk reduction parameters. In general, precompensation relates to measures taken at a transmitter side for compensating crosstalk before it occurs, while crosstalk cancellation refers to measures taken at a receiver side to reduce or cancel crosstalk after it has occurred.

In the following, exemplary illustrative embodiments will be explained for various kinds of user change events both for precompensation and for crosstalk cancellation.

In the following, embodiments for adapting the cancellation parameters will be described in detail using the precompensation matrix P according to equation (9) and the crosstalk cancellation matrix C according to equation (17) as illustrative examples for crosstalk reduction parameters. First, embodiments handling the leaving of users will be discussed. For the following discussion, it will be assumed that before the leaving event, the vectored group comprises $K_0$ users, and $K_L$ users leave the group, for example, due to a change in the selection of users to be part of the vectored group. In this case, after the leaving event the vectored group will consist of $K_0-K_L$ users. In such a case, the dimension of the cancellation matrix (P or C) can be reduced from $K_0 \cdot K_0$ to $(K_0-K_L) \cdot (K_0-K_L)$. Since the numbering of the users is arbitrary, without loss of generality it may be assumed that the "last" $K_L$ users, namely users $K_0-K_L, K_0-K_L+1, \ldots, K_0-1$ leave the vectored group, and the users $0, 1, \ldots, K_0-K_L-1$ remain in the vectored group. In this case, the vector x, the vector y, the matrix H and the like before the leaving event, i.e., with all $K_0$ users still being in the vectored group, can be partitioned as:

$$x = [x_1^T \quad x_2^T]^T \tag{23}$$

$$y = [y_1^T \quad y_2^T]^T \tag{24}$$

$$z = [z_1^T \quad z_2^T]^T \tag{25}$$

$$H = \begin{bmatrix} H_{11} & H_{12} \\ H_{21} & H_{22} \end{bmatrix} \tag{26}$$

wherein $x_1$, $y_1$, $z_1$ and $H_{11}$ are the portions corresponding to the remaining $K_0-K_L$ vectored users, and $x_2$, $y_2$, $z_2$ and $H_{22}$ are portions corresponding to the leaving users. $H_{12}$ and $H_{21}$ comprise the coupling coefficiency between the $K_0-K_L$ users remaining in the vectored group and the $K_L$ leaving users, i.e.,:

$$x_1 = [X_0 \quad X_1 \quad \wedge \quad X_{K_0-K_L-1}]^T \tag{27}$$

$$x_2 = [X_{K_0-K_L} \quad X_{K_0-K_L+1} \quad \wedge \quad X_{K_0-1}]^T \tag{28}$$

$$y_1 = [Y_0 \quad Y_1 \quad \wedge \quad Y_{K_0-K_L-1}]^T \tag{29}$$

$$y_2 = [Y_{K_0-K_L} \quad Y_{K_0-K_L+1} \quad \wedge \quad Y_{K_0-1}]^T \tag{30}$$

$$z_1 = [Z_0 \quad Z_1 \quad \wedge \quad Z_{K_0-K_L-1}]^T \tag{31}$$

$$z_2 = [Z_{K_0-K_L} \quad Z_{K_0-K_L+1} \quad \wedge \quad Z_{K_0-1}]^T \tag{32}$$

$$H_{11} = \begin{bmatrix} H_{0.0} & K & H_{0.K_0-K_L-1} \\ M & O & M \\ H_{K_0-K_L-1.0} & K & H_{K_0-K_L-1.K_0-K_L-1} \end{bmatrix} \tag{33}$$

$$H_{12} = \begin{bmatrix} H_{0.K_0-K_L} & K & H_{0.K_0-1} \\ M & O & M \\ H_{K_0-K_L-1.K_0-K_L} & K & H_{K_0-K_L-1.K_0-1} \end{bmatrix} \tag{34}$$

$$H_{21} = \begin{bmatrix} H_{K_0-K_L.0} & K & H_{K_0-K_L.K_0-K_L-1} \\ M & O & M \\ H_{K_0-1.0} & K & H_{K_0-1.K_0-K_L-1} \end{bmatrix} \tag{35}$$

$$H_{22} = \begin{bmatrix} H_{K_0-K_L.K_0-K_L} & K & H_{K_0-K_1.K_0-1} \\ M & O & M \\ H_{K_0-1.K_0-K_L} & K & H_{K_0-1.K_0-1} \end{bmatrix} \tag{36}$$

Therefore, equation (6) may be re-written as:

$$\begin{bmatrix} y_1 \\ y_2 \end{bmatrix} = \begin{bmatrix} H_{11} & H_{12} \\ H_{21} & H_{22} \end{bmatrix} \begin{bmatrix} x_1 \\ x_2 \end{bmatrix} + \begin{bmatrix} z_1 \\ z_2 \end{bmatrix} \tag{37}$$

After the leaving event, therefore the full matrix H is replaced by the submatrix $H_{11}$, i.e., the matrix describing the coupling of the remaining vectored users after the leaving event.

In the embodiment whereas crosstalk reduction mechanism a zero forcing algorithm as defined, e.g., by equation (17) is used, before the leaving event the crosstalk cancellation matrix C is given by equation (17), i.e., $C=H^{-1}$. The crosstalk cancellation matrix after the leaving event will be denoted C' in the following and in this case is given by:

$$C' = H_{11}^{-1} \tag{38}$$

The above matrix C' for the remaining users, i.e., after the leaving event, basically cancels all crosstalk and modifies noise according to:

$$w_1 = C'y_1 = x_1 + H_{11}^{-1} z_1 \tag{39}$$

wherein $w_1$ comprises the first $K_0-K_L$ elements, i.e., the elements pertaining to the remaining users, of vector w.

The matrix C may be partitioned as:

$$C = \begin{bmatrix} C_{11} & C_{12} \\ C_{21} & C_{22} \end{bmatrix} \quad (40)$$

similar to the partitioning of H given in equation (26), i.e., the dimensions of C, $C_{11}$, $C_{12}$, $C_{21}$ and $C_{22}$ correspond to the dimensions of H, $H_{11}$, $H_{12}$, $H_{21}$, $H_{22}$, respectively, i.e., are equal to $K_0 \cdot K_0$, $(K_0-K_L) \cdot (K_0-K_L)$, $(K_0-K_L) \cdot K_L$, $K_L \cdot (K_0-K_L)$ and $K_L \cdot K_L$, respectively.

As already mentioned with reference to the embodiment shown in FIG. 3, in an embodiment the crosstalk cancellation matrix C is adapted to changes of the properties of the channels used for transmission, for example, using so called channel tracking, which may use a least mean square algorithm. On the other hand, the matrix H needs not be explicitly updated, such that in an embodiment, an updated matrix H (comprising $H_{11}$, $H_{12}$, $H_{21}$, $H_{22}$) is not available during the leaving event in such an embodiment. In an embodiment, C' is calculated based on C. This will be explained in the following:

An inversion of matrix H comprising $H_{11}$, $H_{12}$, $H_{21}$ and $H_{22}$ yields:

$$\begin{bmatrix} H_{11} & H_{12} \\ H_{21} & H_{22} \end{bmatrix}^{-1} = \quad (41)$$

$$\begin{bmatrix} H_{11}^{-1} + H_{11}^{-1}H_{12}(H_{22} - H_{21}H_{11}^{-1}H_{12})^{-1}H_{21}H_{11}^{-1} & -H_{11}^{-1}H_{12}(H_{22} - H_{21}H_{11}^{-1}H_{12})^{-1} \\ -(H_{22} - H_{21}H_{11}^{-1}H_{12})^{-1}H_{21}H_{11}^{-1} & (H_{22} - H_{21}H_{11}^{-1}H_{12})^{-1} \end{bmatrix}$$

Using equations (17), (40) and (41) yields:

$$\begin{bmatrix} C_{11}C_{12} \\ C_{21}C_{22} \end{bmatrix} = \begin{bmatrix} H_{11}^{-1} + H_{11}^{-1}H_{12}(-C_{21}) & -H_{11}^{-1}H_{12}C_{22} \\ -C_{22}H_{21}H_{11}^{-1} & (H_{22} - H_{21}H_{11}^{-1}H_{12})^{-1} \end{bmatrix} \quad (42)$$

$$C_{12} = -H_{11}^{-1}H_{12}C_{22} => -H_{11}^{-1}H_{12} = C_{12}C_{22}^{-1} \quad (43)$$

$$C_{11} = H_{11}^{-1} + H_{11}^{-1}H_{12}(-C_{21}) => C_{11} = H_{11}^{-1} + C_{12}C_{22}^{-1}C_{21} \quad (44)$$

Therefore, according to an embodiment, the crosstalk cancellation matrix after the leaving event C' may be calculated according to:

$$C' = H_{11}^{-1} = C_{11} - C_{12}C_{22}^{-1}C_{21} \quad (45)$$

As can be seen, in such an embodiment $C' \neq C_{11}$ unless $C_{12} = 0$ or $C_{12} = 0$, which is only the case if there is no crosstalk coupling between the leaving users and the remaining users. After such a leaving event, the crosstalk between the leaving users and the remaining users is not cancelled anymore. In an embodiment, users leave the group if they become inactive, i.e., the corresponding lines or communication channels are not used for transmission any longer. In another embodiment, users may leave the group for other reasons. In an embodiment, users are kept in a group unless there is a reason for them leaving.

According to equation (45), the matrix C' according to an embodiment may be calculated comprising the following calculation steps:

calculate the matrix inversion $C_{22}^{-1}$
calculate $C_{12} C_{22}^{-1} C_{21}$, and
calculate $C_{11} - C_{12}C_{22}^{-1}C_{21}$.

As an example, if one user leaves the vectored group at a time, i.e., $K_L=1$, the operation required to calculate C' according to the above steps a)-c) are one scalar division for step a), $K_0 \cdot (K_0-1)$ scalar multiplications for step b) and $(K_0-1) \cdot (K_0-1)$ scalar additions for step c). In cases where more than one user simultaneously leaves the vectored group, in an embodiment step a)-c) are performed with $K_L$ corresponding to the number of simultaneously leaving users. In another embodiment, the event of $K_L$, $K_L > 1$ users leaving simultaneously is treated as $K_L$ sequential events of only one user leaving. In such an embodiment, C' is calculated by using $K_L$ runs of step a)-c), wherein in each run one leaving user is assumed.

Above, the calculation of a new crosstalk cancellation matrix C' based on a previous crosstalk cancellation matrix C in case of one or more users leaving the vectored group according to an embodiment has been explained in detail. According to an embodiment, the calculation of a new precompensation matrix P' based on an existing precompensation matrix P is basically performed in the same manner. In particular, from equations (9) and (17) it can be seen that:

$$P = C \cdot D \quad (46)$$

and $$P' = C' \cdot D' \quad (47)$$

wherein P' denotes the precompensation matrix after the leaving event, P denotes the precompensation matrix before the leaving event and $D' = \{H_{11}\}_d$ is a diagonal matrix. It should be noted that in an embodiment, the diagonal elements of H which are determined in the initialization basically do not vary during operation and therefore the values determined up the initialization of the system may be used for the calculation of P'.

In case H is the same for upstream and downstream directions, P' may be directly calculated from C' based on equation (47) in an embodiment. In case H differs for upstream and downstream direction, the calculation of P' may also be performed as outlined above taking the diagonal matrix D and D' into account. In other words, in this case P' may be calculated as $$P' = P_{11} - P_{12}P_{12}^{-1}P_{21} \quad (48)$$

wherein the partitioning of P into $P_{11}$, $P_{22}$, $P_{21}$ and $P_{12}$ corresponds to the already explained partitioning of H and C.

Next, embodiments for adapting crosstalk reduction parameters like matrices C and P in case of users joining a vectored group will be discussed.

In an embodiment when one or more users join a vectored group, the coupling coefficient $H_{k,l}$ characterizing crosstalk between the newly joining users and the users already in the vectored group are determined, for example, by channel estimation.

In an embodiment, such a determination of coupling coefficients is made when a user joins a vectored group for the first time, and the coefficients determined in this way are stored in a memory. When users leave the group and join the group again later (rejoining), the stored coefficients are used. In another embodiment, the coefficients are not stored and determined anew every time the user joins a vectored group. In other embodiments, coefficients may be stored and reused if the rejoining occurs within a predetermined time span, for example, a time span where in the variation of coupling coefficients is smaller than a predetermined maximum variation. In case a longer time passes before the rejoining, the coupling coefficients are determined anew, for example, using channel estimation.

The same possibilities are used in embodiments for the coupling coefficients between a plurality of joining lines.

In such embodiments, the coupling coefficients $H_{k,l}$ between the joining user(s) and the users already within the vectored group and, in case more than one user joins, also the coupling coefficients $H_{k,l}$ between the joining users themselves are available, either by taking them from a memory or by determining them anew.

In the following, similar to the case of user leaving events as described above, matrices and vectors before the joining event will be denoted H, C, x, y etc., while after the joining event they are denoted H', C', x', y' etc.

In the following, the situation will be analyzed when $K_J$ new users are joining an existing vectored group comprising $K_0$ users. Then after the joining event, the vectored group will consist of $K_0+K_J$ users. Consequently, the dimension of the matrices P, C etc. after the joining event will be increased from $K_0 \cdot K_0$ to $(K_0+K_J) \cdot (K_0+K_J)$. Similar to the case of user leaving, without loss of generality it may be assumed that the joining users have the highest indices k. In this case, the matrix H' after the joining event may be written as:

$$H' = \begin{bmatrix} H'_{11} & H'_{12} \\ H'_{21} & H'_{22} \end{bmatrix} \quad (49)$$

wherein $H'_{11}$ is the $K_0 \cdot K_0$ coupling matrix for the vectored users before the joining event. $H'_{22}$ is the $K_J \cdot K_J$ coupling matrix describing crosstalk within the new joining $K_J$ users. $H'_{12}$ and $H'_{21}$ are $K_0 \cdot K_J$ and $K_J \cdot K_0$ matrices comprising the coupling coefficients between the users already in the vectored group and the newly joining users, respectively.

Taking again the zero forcing crosstalk reduction wherein the crosstalk cancellation matrix C of a linear equalizer is determined by equation (17) as an example, the matrix C before the joining event and the matrix C' after the joining event may be written as:

$$C = H'^{-1}_{11} \quad (50)$$

$$C' = H'^{-1} \quad (51)$$

Similar to the matrix H', C' may be partitioned as:

$$C' = \begin{bmatrix} C'_{11} & C'_{12} \\ C'_{21} & C'_{22} \end{bmatrix} \quad (52)$$

wherein $C'_{11}$, $C'_{12}$, $C'_{21}$ and $C'_{22}$ have the same dimensions as $H'_{11}$, $H'_{12}$, $H'_{21}$ and $H'_{22}$, respectively. As already mentioned, in an embodiment the matrix C is updated during use, such that immediately before the joining event the matrix C is up to date, but the original matrix $H_{11}'^{-1} = H^{-1}$ determined at initialization of the system due to channel variations and the like may not be entirely accurate. On the other hand, as explained above, the coupling matrices relating to the newly joining users, i.e., $H'_{12}$, $H'_{21}$ and $H'_{22}$ are available when new users join the vectored group, either by a determination process or by taking them from a storage.

In other words, in such an embodiment for calculating the matrix C' after the joining event $C = H'^{-1}_{11}$, $H'_{12}$, $H'_{21}$ and $H'_{22}$ are immediately available. An inversion of matrix H' as in equation (49) yields:

$$\begin{bmatrix} H'_{11} H'_{12} \\ H'_{21} H'_{22} \end{bmatrix}^{-1} = \quad (53)$$

$$\begin{bmatrix} H'^{-1}_{11} + H'^{-1}_{11} - H'_{12}(H'_{22} - H'_{21}H'^{-1}_{11}H'_{12})^{-1}H'_{21}H'^{-1}_{11} & -H'^{-1}_{11}H'_{12}(H'_{22} - H'_{21}H'^{-1}_{11}H'_{12})^{-1} \\ -(H'_{22} - H'_{21}H'^{-1}_{11}H'_{12})^{-1}H'_{21}H'^{-1}_{11} & (H'_{22} - H'_{21}H'^{-1}_{11}CH'_{12})^{-1} \end{bmatrix}$$

together with equations (51) and (52), this yields:

$$\begin{bmatrix} C'_{11} C'_{12} \\ C'_{21} C'_{22} \end{bmatrix} = \quad (54)$$

$$\begin{bmatrix} C + CH'_{12}(H'_{22} - H'_{21}CH'_{12})^{-1}H'_{21}C & -CH'_{12}(H'_{22} - H'_{21}CH'_{12})^{-1} \\ -(H'_{22} - H'_{21}CH'_{12})^{-1}H'_{21}C & (H'_{22} - H'_{21}CH'_{12})^{-1} \end{bmatrix}$$

Consequently, C' can be calculated according to the following equations:

$$C'_{22} = (H'_{22} - H'_{21}CH'_{12})^{-1} \quad (55)$$

$$C'_{21} = -C'_{22}H'_{21}C \quad (56)$$

$$C'_{12} = -CH'_{12}C'_{22} \quad (57)$$

$$C'_{11} = C - CH'_{12}C'_{21} \text{ or } C'_{11} = C - C'_{12}H'_{21}C \quad (58)$$

Therefore, according to an embodiment of the present invention, C' may be calculated based on C, $H'_{12}$, $H'_{21}$ and $H'_{22}$ with the following steps:

calculate $H'_{21}C$ and $CH'_{12}$
    calculate $C'_{22} = (H'_{22} - H'_{21}CH'_{12})^{-1}$ using the result of a)
    calculate $C'_{21} = -C'_{22}H'_{21}C$ and $C'_{12} = -CH'_{12}C'_{22}$ using the results of a) and b)
    calculate $C'_{11} = C - CH'_{12}C'_{21}$ (or in another embodiment $C'_{11} = C - C'_{12}H'_{21}C$) by using the results of a) and c)).

In case only one user joins the vectored group at the same time, i.e. $K_J = 1$, the matrix inversion of step b) may be performed by a single division. In such a case, the operations required to compute C' are as follows:

For step a), $K_0 \cdot (K_0-1)$ multiplications and $2 \cdot K_0 \cdot K_0$ additions, for b) $K_0$ multiplications, $K_0$ additions and one division, for step c) $2 \cdot K_0$ multiplications, and for step d) $K_0$ multiplications and $K_0$ additions.

Similar to the case of user leaving, in case there is more than one user simultaneously joining the vectored group, in an embodiment C' may be calculated according to steps a)-d) with $K_j$ being the numbers of joining users. In another embodiment, the simultaneously joining users are treated as users joining the vectored group sequentially, and C' in such an embodiment may be performed by repeating steps a) to d) for each joining user, wherein in each repetition one joining user is treated.

In an embodiment, similar to the user leaving event, also in the user joining case a new precompensation matrix P' may be calculated based on the old precompensation matrix P before the joining event and the coupling coefficients $H'_{21}$, $H'_{12}$ and $H'_{22}$ in an analogous manner since $P'=C'D'$ wherein $D'=\{H'\}_d$, i.e., a known diagonal matrix.

Next, the handling of user exchanging events, i.e., combinations of users leaving and users joining a vectored group, will be discussed. In an embodiment, such user exchanging is used in case some channels of a total number of channels, for example, channels on lines in a binder, are treated in a vectored group. In such an embodiment, the conditions of each user may change, for example, due to power management, and the communication system dynamically may reselect users or channels to be vectored, i.e., discard some users from the vectored group and add some users to the vectored group for example to optimize performance.

In an embodiment of the present invention, to handle user exchanging events, the leaving users and the joining users are treated sequentially, e.g., first leaving users are treated, e.g., as explained in the embodiments above, then joining users are treated, e.g., as in the embodiments explained above, or leaving and joining users are treated alternatively according to the above embodiment or other embodiments of the present invention.

In another embodiment which will be described in the following, the joining and leaving is treated basically simultaneously.

Basically simultaneously in an embodiment means that the internal calculations to be performed in the communication system, for example, updating crosstalk reduction parameters, are performed jointly.

In an embodiment of the invention which will be discussed first, a number of users joining the vectored group is equal to a number of users leaving the vectored group. For example, in an embodiment of the invention, a communication system is adapted to keep as many active users, e.g., channels performing data communication, in the vectored group as possible, for example, as allowed by the computational power available. In case not all the active users may be incorporated in the vectored group, the already explained partial vectoring is performed. In case one or more users in the vectored group become inactive, they are replaced by a corresponding number of active users outside the group if possible. If, in an embodiment, a user outside the group becomes active and turns out to cause significant crosstalk, such a user may be added to the vectored group and a user generating or experiencing less crosstalk may be removed from the group. In an embodiment, this is performed such that the crosstalk reduction experienced by users in the vectored group after the user change event does not exceed crosstalk experienced by the users in the vectored group before the user change. An embodiment of a corresponding method for managing a vectored group in a communication system will be discussed with reference to FIG. 4. FIG. 4 is a schematic flow diagram of a method according to an embodiment of the invention.

In the embodiment, it is assumed that a vectoring as explained above is performed for some or all of the active users of a plurality of users, for example, using the zero forcing algorithm for crosstalk precompensation or crosstalk cancellation as explained above. In a step 50 of the embodiment of FIG. 4, the users are monitored to detect status changes. In an embodiment, it is monitored if a user which is vectored, i.e., part of the vectored group, becomes inactive, or a hitherto inactive user outside the vectored group becomes active.

When such a status change occurs, in step 51 it is checked whether the maximum number of users in the vectored group is already reached. As indicated above, the maximum number of users in the vectored group may, for example, be limited by the computational power available in signal processors and the like to perform the vectoring.

Figure 4:
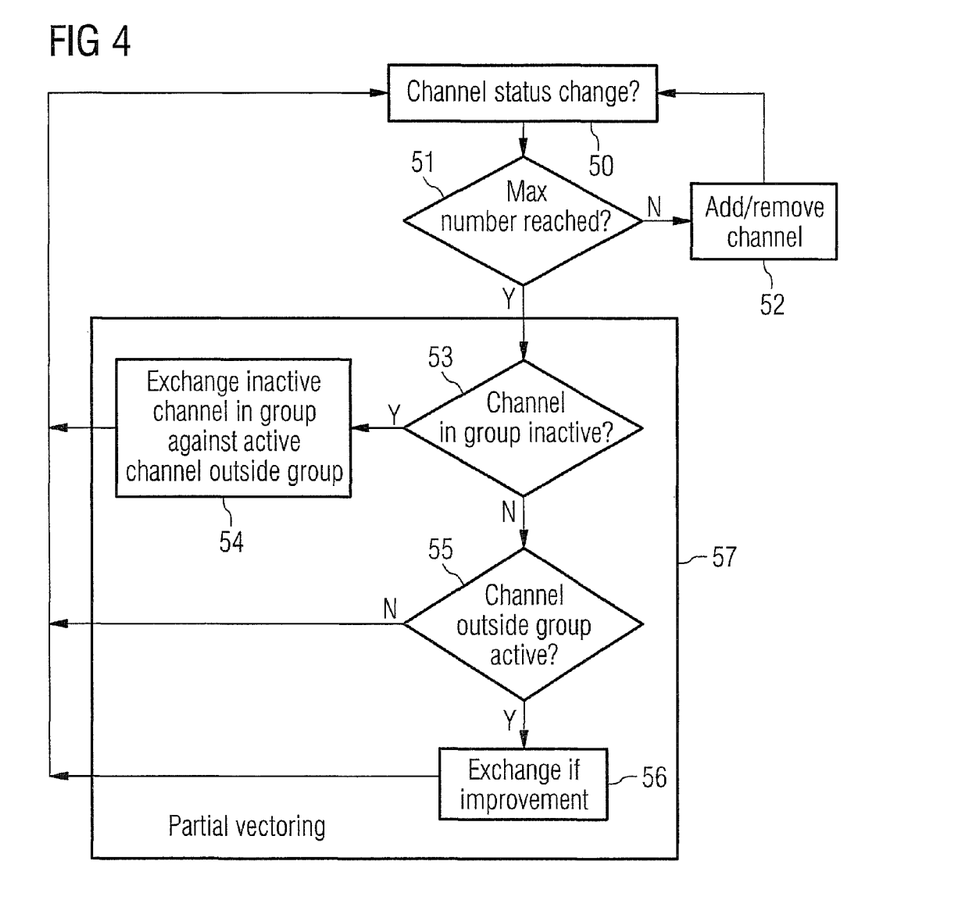
FIG. 4 shows a flow diagram of a communication method according to an embodiment of the invention.

If the maximum number is not reached, which in the embodiment of FIG. 4 means that all active users are in the vectored group, in step 52, if the user status change of step 50 indicated that a user within the group became inactive, this user is removed from the group, and if the user status change indicates that a user outside the group became active, this user is added to the group. In an embodiment of the invention, in step 52 to this end the above described embodiments for user leaving and user joining are used.

If the maximum number of users in the vectored group is already reached, as indicated by box 57 in FIG. 4 this essentially means that partial vectoring as explained above is performed.

In this case, in step 53 it is checked whether the user status change of step 50 indicates that a user in the group became inactive. In this case, in step 54, the inactive user in the vectored group is exchanged against an active user outside the group. The choice of the active channel outside the group in an embodiment may depend on properties like crosstalk generated or experienced by the active user outside the group or also service contracts with a user outside the group.

If no user in the group became inactive, it is checked in step 55 whether a user outside the group became active. If this is the case, in step 56 an exchange is performed adding the user which became active to the vectored group and removing another user from the vectored group if this leads to an overall improvement of the crosstalk situation or also if some other reason like guaranteed data rate for the newly active user outside the group makes it necessary. This exchange of users in an embodiment is performed in a seamless manner, i.e., joining and leaving are performed basically simultaneously.

After step 54, 56 and 52 and if the checking of step 55 is negative, the method is continued with step 50 to wait for the next user status change.

It should be noted that if in step 50 only user status changes where a user in the vectored group becomes inactive or a user outside the group becomes active are detected (other possibilities would include a user outside the group becoming inactive) step 55 may be omitted. Furthermore, in another embodiment, the order of the steps may be different, for example steps 55 may be performed before step 53.

During the vectoring, in an embodiment of the invention crosstalk reduction parameters like the above-explained matrixes P and C are updated, for example, using channel tracking. Further modifications of the embodiment of FIG. 4 are possible in other embodiments. For example, user status changes may include other changes of the crosstalk behavior of users, for example, due to power management.

Furthermore, while in the embodiment of FIG. 4 in partial vectoring (box 57) a user outside the group may be exchanged against a user inside the group, in another embodiment more than one user may be exchanged simultaneously, for example, two users inside the group against two users outside the group.

Next, an embodiment of a method according to the invention for updating the crosstalk reduction parameters in the case of a user exchange will be discussed. In this embodiment, it is assumed that $K_O$ users are in the vectored group, and $K_L$ users of the $K_O$ users are replaced, i.e., $K_L$ leaving users are replaced by $K_L$ joining users. Without loss of generality it is assumed that the last $K_L$ users of the $K_O$ users in the vectored group are replaced, while the first $K_O-K_L$ users remain.

The coupling matrix before the exchanging event will be denoted H, and the matrix after the changing event is H". H und H" may be written as:

$$H = \begin{bmatrix} H_{11} & H_{12} \\ H_{21} & H_{22} \end{bmatrix} \quad (59)$$

$$H'' = \begin{bmatrix} H''_{11} & H''_{12} \\ H''_{21} & H''_{22} \end{bmatrix} \quad (60)$$

wherein the dimensions of H, $H_{11}$, $H_{12}$, $H_{21}$ and $H_{22}$ are $K_O \cdot K_O$, $(K_O-K_L) \cdot (K_O-K_L)$, $(K_O-K_L) \cdot K_L$, $K_L \cdot (K_O-K_L)$ and $K_L \cdot K_L$, respectively. When H" is known, a new precompensation matrix P or a new crosstalk cancellation matrix C in an embodiment is calculated according to equations (9) and (17), respectively.

In another embodiment, H immediately before the exchange is known. In this case, it may be used that $H''_{11}=H_{11}$, and $H''_{11}{}^{-1}=H_{11}{}^{-1}$, which makes it possible to partially use the results and calculations made before the exchange according to:

$$H'' = \begin{bmatrix} H''_{11} & 0 \\ 0 & H''_{22} \end{bmatrix} \left( I + \begin{bmatrix} H''_{11} & 0 \\ 0 & H''_{22} \end{bmatrix}^{-1} \begin{bmatrix} 0 & H''_{12} \\ H''_{21} & 0 \end{bmatrix} \right) \quad (61)$$

$$H''{}^{-1} = \left( I + \begin{bmatrix} H''_{11}{}^{-1} & 0 \\ 0 & H''_{22}{}^{-1} \end{bmatrix} \begin{bmatrix} 0 & H''_{12} \\ H''_{21} & 0 \end{bmatrix} \right)^{-1} \begin{bmatrix} H''_{11}{}^{-1} & 0 \\ 0 & H''_{22}{}^{-1} \end{bmatrix} \quad (62)$$

In an embodiment, furthermore the first order approximation of equation (20) may be used, and $H''{}^{-1}$ may be calculated according to:

$$H''{}^{-1} \approx \left( I - \begin{bmatrix} H''_{11}{}^{-1} & 0 \\ 0 & H''_{22}{}^{-1} \end{bmatrix} \begin{bmatrix} 0 & H''_{12} \\ H''_{21} & 0 \end{bmatrix} \right) \begin{bmatrix} H''_{11}{}^{-1} & 0 \\ 0 & H''_{22}{}^{-1} \end{bmatrix} \quad (63)$$

$H''{}^{-1}$ as calculated by equation (62) or (63) may then be used for calculating P or C as explained above.

It should be noted that in this embodiment $H''_{22}$ which is the coupling matrix corresponding to the $K_L$ joining users and $H''_{12}$, $H''_{21}$ comprise the coupling coefficients between the non-exchanged users and the joining users are determined anew, for example, using channel examination.

In still another embodiment which will be described next, crosstalk reduction parameters after the user exchange are calculated based on crosstalk reduction parameters before the user exchange as will be explained below. In this embodiment, the number of leaving users may or may not be equal to the number of joining users.

In particular, without loss of generality it will be assumed that the last $K_L$ users out of $K_O$ users in the vectored group leave the group, and $K_J$ users join the group. It should be noted that $K_J$ may be equal or unequal to $K_L$.

The coupling matrix before the exchanging event will be denoted H, and after the changing event H'''. These matrixes may be written as:

$$H = \begin{bmatrix} H_{11} & H_{12} \\ H_{21} & H_{22} \end{bmatrix} \quad (64)$$

$$H''' = \begin{bmatrix} H'''_{11} & H'''_{12} \\ H'''_{21} & H'''_{22} \end{bmatrix} \quad (65)$$

It is assumed in the currently discussed embodiment that the coupling matrixes $H'''_{12}$, $H'''_{21}$ and $H'''_{22}$ which relate to the newly joined users are known similar to the case of, the embodiments of users joining discussed above, for example, by explicit determination using, for example, channel estimation or by reading them. On the other hand, in an embodiment the current values of $H'''_{11}$ are not known, for example, due to channel variation.

Furthermore, before the exchange event, the crosstalk reduction parameters like the crosstalk cancellation matrix C which may be written as:

$$C = \begin{bmatrix} C_{11} & C_{12} \\ C_{21} & C_{22} \end{bmatrix} \quad (66)$$

are known in the currently discussed embodiment, for example, by using channel tracking to update these parameters.

In the following, an embodiment for determining a crosstalk cancellation matrix C" after the exchange event which may be written as:

$$C'' = \begin{bmatrix} C''_{11} & C''_{12} \\ C''_{21} & C''_{22} \end{bmatrix} \quad (67)$$

will be discussed.

In equations (64) to (67) the dimensions of H, $H_{11}$, $H_{12}$, $H_{21}$, $H_{22}$ are $K_O \cdot K_O$, $(K_O-K_L) \cdot (K_O-K_L)$, $(K_O-K_L) \cdot K_L$, $K_L \cdot (K_O-K_L)$, and $K_L \cdot K_L$, respectively, and $C_{ij}$ has the same dimension as $H_{ij}$ (i,j=1,2). The dimensions of H''', $H'''_{11}$, $H'''_{12}$, $H'''_{21}$, $H'''_{22}$ are $(K_O-K_L+K_J) \cdot (K_O-K_L+K_J)$, $(K_O-K_L) \cdot (K_O-K_L)$, $(K_O-K_L) \cdot K_J$, $K_J(K_O-K_L)$, and $K_J \cdot K_J$, respectively, C"$_{ij}$ has the same dimension as $H'''_{ij}$.

As an example, crosstalk cancellation matrixes according to equation (17) will be used, i.e. $C=H^{-1}$ and $C''=H'''{}^{-1}$. From equation (45) combined with $C=H^{-1}$ and $H'''_{11}=H_{11}$ which is true in case of an exchanging event, it follows that:

$$H'_{11}{}^{-1}=H_{11}{}^{-1}=C_{11}-C_{12}C_{22}{}^{-1}C_{21} \quad (68)$$

With equation (68), in a similar manner to equations (53) to (58) C" in an embodiment is calculated according to:

$$C''_{22}=(H'''_{22}-H'''_{21}H'''_{11}{}^{-1}H'''_{12})^{-1} \quad (69)$$

$$C''_{21}=-C''_{22}H'''_{21}H'''_{11}{}^{-1} \quad (70)$$

$$C''_{12} = -H'''^{-1}_{11} H'''_{12} C''_{22} \quad (71)$$

$$C''_{11} = H'''^{-1}_{11} - H'''^{-1}_{11} H'''_{12} C''_{21}$$

(or, in another embodiment, $$C''_{11} = H'''^{-1}_{11} - C''_{12} H'''_{21} H'''^{-1}_{11}) \quad (72)$$

It should be noted that in this embodiment according to equations (69) to (72) the previously discussed embodiments according to equation (47) on the one hand and equations (55) to (58) on the other hand as special cases. In particular, a leaving event corresponds to $K_J=0$ in which case equations (69) to (72) are reduced to equation (45), whereas the joining event corresponds to the case $K_L=0$ wherein equations (69) to (72) are reduced to equations (55) to (58).

In case of an exchanging event, according to an embodiment, the calculation of a precompensation matrix P''' after a joining event is performed analogous to the calculation of C''' explained above, since P'''=C'''D''' and D'''={H''}$_d$ is a matrix which is known in this embodiment.

Figure 5:
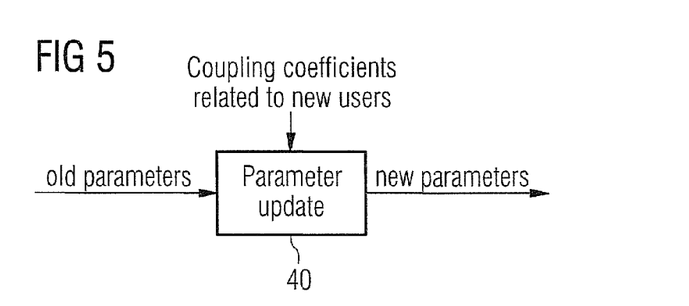
FIG. 5 shows a block diagram of a portion of a control unit according to an embodiment of the present invention.

In FIG. 5, a schematic block diagram for a portion of a control unit for updating crosstalk reduction parameters like precompensation matrix P and crosstalk cancellation matrix C is shown, wherein the embodiment of FIG. 5 may be used for implementing some or all of the above discussed embodiments, but also may be used for implementing other embodiments of the invention.

The embodiment of FIG. 5 comprises a parameter update circuit 40 which receives the old parameters, i.e., crosstalk reduction parameters before a user change event, and outputs new parameters valid after the user change event. Parameter update circuit 40 calculates the new parameters based on the old parameters. In case of users joining the vectored group, i.e., a user joining or a user exchange event, parameter update circuit 40 additionally receives coupling coefficients related to new users themselves, i.e., describing the crosstalk between the new users and the crosstalk between new users and already present users. In this case, an embodiment also these coupling coefficients are used for calculating the new parameters in addition to the old parameters.

The above described embodiments are only to be taken as illustrative examples of the present invention and not to be construed in a limiting sense. In particular, the present invention may be practised in other ways than explained with reference to the above embodiments. For example, while in the above embodiment references have been made to DSL communication, embodiments can also be used in other wire line of wireless communications where a cooperative crosstalk cancellation, i.e., a crosstalk cancellation over a plurality of users, links, communication channels or the like, is performed. Furthermore, while in some of the embodiments discussed above zero forcing as, for example, defined in equations (9) or (17) have been used as an example, other embodiments used other cancellation schemes, like decision feedback equalizing or minimum mean square equalizing as represented in equation (19). Also, approximations for example in equations (20) to (22) may be used as a basis for embodiments of the invention. In embodiments, for applying the present invention to a particular equalization scheme, by using the dependency of crosstalk reduction parameters, for example, precompensation matrixes, crosstalk matrixes and the like, on coupling parameters (like matrix H) between communication channels before and after a user change, crosstalk reduction parameters after the user change may be calculated based on crosstalk reduction parameters before the user change. In embodiments where the crosstalk reduction parameters may be written in matrix form, such a matrix may be partitioned in portions relating to parameters for channels before the user change events and to parameters for channels joining and/or leaving during the user change event. Furthermore, in some of the embodiments above the cancellation matrix C or the precompensation matrix P were calculated or updated based on the coupling matrix H. In a similar manner, if for example the cancellation matrix C or the precompensation matrix P is directly adapted and estimated, for example, through some known test or pilot signal and/or a decision made by a decoder, the coupling matrix H can be calculated based on C or P in a similar manner in a corresponding embodiment of the invention. In this respect, it should be noted that the coupling matrix may also be seen as a crosstalk reduction parameter in the sense of the present application since the crosstalk reduction mechanisms described above are alternatively based on the coupling between the channels which is described by the coupling matrix.

The embodiments of FIGS. 2 to 4 may be implemented as hardware, software, firmware or a combination thereof.

As can be seen from the above, numerous modifications are within the capabilities of a person skilled in the art without departing from the scope the present invention, which is not to be limited by the exemplary embodiments described above, but which is intended to be defined only by the appended claims.

What is claimed is:

1. A method for crosstalk reduction, the method comprising:
   reducing crosstalk of a group of communication channels electronically and based on crosstalk reduction parameters;
   changing a composition of the group of communication channels, changing the composition comprising at least one step taken from the group consisting of including at least one additional communication channel to the group, removing at least one communication channel from the group and exchanging at least one communication channel of the group for at least one communication channel not in the group;
   calculating crosstalk reduction parameters after the change of composition based on crosstalk reduction parameters before the change of composition, calculating comprising calculating a second matrix after the change of composition based on a first matrix defined before the change of composition, the first matrix comprising elements characterizing crosstalk between communication channels in the group of communication channels before the change and the second matrix comprising elements characterizing crosstalk between communication channels in the group of communication channels after the change, wherein calculating the second matrix based on the first matrix comprises subtracting a third matrix based on portions of the first matrix related at least in part to at least one channel to be removed from the group of communication channels from a fourth matrix based on a portion of the first matrix related only to channels remaining in the group of communication channels.

2. The method according to claim 1, wherein the step of reducing crosstalk comprises:
   providing, for each communication channel of the group, a data symbol to be transmitted via the respective communication channel; and
   calculating, for each of the communication channels of the group, a transmit symbol for transmission over the respective communication channel based on the data symbols and the crosstalk reduction parameters.

3. The method according to claim 1, wherein reducing crosstalk uses an equalizing technique taken from the group consisting of a zero forcing algorithm, a minimum mean square error equalizer, a decision feedback equalizer, a linear equalizer, a non-linear equalizer and approximations thereof.

4. The method according to claim 1, wherein the communication channels in the group are assigned to a plurality of users, wherein each communication channel corresponds to a predetermined frequency range, and wherein at least two channels being assigned to different frequency ranges correspond to a same user.

5. The method according to claim 1, wherein calculating comprises calculating the crosstalk reduction parameters after the change of composition only based on the crosstalk reduction parameters before the change of composition.

6. The method according to claim 1, wherein changing the composition comprises adding at least one communication channel to the group, and wherein calculating comprises calculating the crosstalk reduction parameters after the change based on the crosstalk reduction parameters before the change and further parameters describing at least one coupling taken from the group consisting of a coupling between different ones of the at least one added communication channel and coupling between the at least one added communication channel and at least one communication channel already in the group.

7. A method for crosstalk reduction, the method comprising:
multiplying a vector comprising first data symbols with a crosstalk reduction matrix to obtain a vector comprising second data symbols, wherein at least one of the first data symbols and at least one of the second data symbols is assigned to each communication channel in a group of communication channels; and
changing a composition of the group of communication channels, changing the composition of the group comprising including at least one additional communication channel to the group, or removing at least one communication channel from the group, or exchanging at least one communication channel from the group; and
calculating the crosstalk reduction matrix after the change based on the crosstalk reduction matrix before changing the composition of the group, calculating comprising calculating a second matrix after the change of composition based on a first matrix defined before changing the composition of the group, the first matrix comprising elements characterizing crosstalk between communication channels in the group of communication channels before changing the composition of the group and the second matrix comprising elements characterizing crosstalk between communication channels in the group of communication channels after changing the composition of the group, wherein calculating the second matrix based on the first matrix comprises subtracting a third matrix based on portions of the first matrix related at least in part to at least one channel to be removed from the group of communications channels from a fourth matrix based on a portion of the first matrix related only to channels remaining in the group of communications channels; and
reducing crosstalk electronically and based on the calculated crosstalk reduction parameters.

8. The method according to claim 7,
wherein changing the composition comprises removing communication channels from the group,
wherein calculating comprises calculating F' as a matrix after the change according to:

$$F' = H_{11}^{-1} = F'_{11} - F_{12} F_{22}^{-1} F_{21}$$

wherein, $$F = \begin{bmatrix} F_{11} & F_{12} \\ F_{21} & F_{22} \end{bmatrix}$$

is a matrix before the change,
wherein $F_{11}$ is a matrix portion linking first data symbols assigned to communication channels in the group with second data symbols assigned to communication channels remaining in the group,
wherein $F_{22}$ is a matrix portion linking first data symbols assigned to communication channels being removed from the group with second data symbols assigned to communication channels removed from the group,
wherein $F_{12}$ is a matrix portion linking first data symbols assigned to communication channels being removed from the group with second data symbols being assigned to communication channels remaining in the group, and
wherein $F_{21}$ is a matrix portion linking first data symbols assigned to communication channels remaining in the group with second data symbols assigned to communication channels leaving the group, and
wherein $H_{11}$ is a matrix describing couplings between communications channels in the group before the change.

9. A method for crosstalk reduction, the method comprising:
reducing crosstalk of a group of communication channels electronically and based on crosstalk reduction parameters;
changing a composition of the group of communication channels, changing the composition comprising simultaneously including at least one additional communication channel to the group and removing at least one communication channel from the group; and
calculating crosstalk reduction parameters after the change of composition based on crosstalk reduction parameters before the change of composition, calculating comprising calculating a second matrix after changing the composition of the group based on a first matrix defined before changing the composition of the group, the first matrix comprising elements characterizing crosstalk between communication channels in the group before changing the composition of the group and the second matrix comprising elements characterizing crosstalk between communication channels in the group after changing the composition of the group, wherein calculating the second matrix based on the first matrix comprises subtracting a third matrix based on portions of the first matrix related at least in part to at least one channel to be removed from the group of communication channels from a fourth matrix based on a portion of the first matrix related only to channels remaining in the group of communication channels.

10. The method according to claim 9, wherein a number of additional channels being included to the group is equal to a number of communication channels being removed from the group.

11. The method according to claim 9, wherein the at least one communication channel being removed from the group comprises an inactive communication channel.

12. The method according to claim 9, wherein reducing crosstalk comprises reducing crosstalk of the group of communication channels based on crosstalk reduction parameters, the method further comprising:
calculating crosstalk reduction parameters after simultaneously adding and removing based on crosstalk reduction parameters before simultaneous including and removing.

13. The method according to claim 9, wherein crosstalk experienced by communication channels in the group after simultaneously including and removing does not exceed crosstalk experienced by channels in the group before simultaneously adding and removing.

14. An apparatus for crosstalk reduction, the apparatus comprising:
a crosstalk reduction circuit coupled to a group of communication channels to at least partially compensate crosstalk of the group based on crosstalk reduction parameters;
a control circuit to change a composition of the group of communication channels; and
a calculation circuit to calculate crosstalk reduction parameters after the change of composition based on crosstalk reduction parameters before the change of composition, the change of composition comprising including at least one additional communication channel to the group, or removing at least one communication channel from the group, or exchanging at least one communication channel from the group, wherein the calculation circuit calculates a second matrix after the change of composition based on a first matrix defined before the change of composition, the first matrix comprising elements characterizing crosstalk between communication channels in the group before the change of composition and the second matrix comprising elements characterizing crosstalk between communication channels in the group after the change of composition, wherein the calculation circuit calculates the second matrix based on the first matrix by subtracting a third matrix based on portions of the first matrix related at least in part to at least one channel to be removed from the group of communication channels from a fourth matrix based on a portion of the first matrix related only to channels remaining in the group of communication channels.

15. The apparatus according to claim 14, wherein the calculation circuit calculates, for each of the communication channels of the group, a symbol for further processing based on a data symbol assigned to the respective communication channel and the crosstalk reduction parameters.

16. The apparatus according to claim 14, wherein the crosstalk reduction circuit comprises at least one equalizer taken from the group consisting of a zero forcing equalizer, a minimum mean square error equalizer, a decision feedback equalizer, a linear equalizer, and a non-linear equalizer.

17. The apparatus according to claim 14,
wherein the calculation circuit calculates the crosstalk reduction parameters after the change based on the crosstalk reduction parameters before the change and further parameters describing at least one coupling taken from the group consisting of a coupling between different ones of the at least one added communication channel and coupling between the at least one added communication channel and at least one communication channel already in the group.

18. The apparatus according to claim 14, wherein the calculation circuit multiplies a vector comprising first data symbols with a matrix to obtain a vector comprising second data symbols, wherein at least one of the first data symbols and at least one of the second data symbols is assigned to each channel in the group.

19. A communication circuit comprising:
a first circuit portion to output a plurality of first data units, each first data unit being assigned to a communication channel of a plurality of communication channels; and
a calculation circuit to calculate, for a group of the communication channels, second data units based on all first data units of the communication channel in the group, wherein each second data unit is assigned to one of the communication channels in the group, based on crosstalk reduction parameters; and
wherein, upon a change of composition of the group, crosstalk reduction parameters after the change of composition is determined based on crosstalk reduction parameters before the change of composition by the calculation circuit, wherein the change of the composition of the group comprises including at least one additional communication channel to the group, or removing at least one communication channel from the group, or exchanging at least one communication channel from the group, and wherein the crosstalk reduction parameters are calculated by calculating a second matrix after the change of composition of the group based on a first matrix defined before the change of composition of the group, the first matrix comprising elements characterizing crosstalk between communication channels in the group before the change of composition and the second matrix comprising elements characterizing crosstalk between communication channels in the group after the change of composition of the group, wherein the second matrix is calculated based on the first matrix by subtracting a third matrix based on portions of the first matrix related at least in part to at least one channel to be removed from the group from a fourth matrix based on a portion of the first matrix related only to channels remaining in the group.

20. The communication circuit according to claim 19, wherein the communication circuit is a digital subscriber line communication circuit.

21. The communication circuit according to claim 19, wherein the first circuit portion is a receiver circuit portion to receive data via a plurality of communication channels from a transmitter remote from the communication circuit.

22. The communication circuit according to claim 19, wherein the communication circuit comprises a second circuit portion to transmit data based on the second data unit via the plurality of communication channels to a receiver remote from the communication circuit.

23. An apparatus for crosstalk reduction, the apparatus comprising:
means for reducing crosstalk of a group of communication channels based on crosstalk reduction parameters;
means for changing a composition of the group of communication channels; and
means for calculating crosstalk reduction parameters after the change of composition based on crosstalk reduction parameters before the change of composition, wherein the change of the composition comprises including at least one additional communication channel to the group of communication channels, or removing at least one communication channel from the group of communication channels, or exchanging at least one communication channel from the group, wherein the means for calculating calculates a second matrix after the change of composition based on a first matrix defined before the change of composition, the first matrix comprising elements characterizing crosstalk between communication channels in the group before the change of composition and the second matrix comprising elements characterizing crosstalk between communication channels in the group after the change of composition, wherein the means for calculating calculates the second matrix based on the first matrix by subtracting a third matrix based on portions of the first matrix related at least in part to at least one channel to be removed from the group of communication channels from a fourth matrix based on a portion of the first matrix related only to channels remaining in the group of communication channels.

24. The apparatus according to claim 23, further comprising:
means for providing, for each communication channel of the group, a data symbol to be transmitted via the respective communication channel, and
wherein the calculation means comprise means for calculating for each of the communication channels of the group a transmit symbol for transmission over the respective communication channel based on a data symbol and crosstalk communication parameters.

25. The apparatus according to claim 23, further comprising:
means for receiving for each communication channel of the group a receive symbol,
wherein the calculating means comprise means for calculating for each of the communication channels of the group a data symbol for further processing based on the receive symbol and the crosstalk reduction parameters.

26. An apparatus for crosstalk reduction, the apparatus comprising:
a crosstalk reduction circuit coupled to a group of communication channels to at least partially compensate the crosstalk of the group; and
a control circuit to change a composition of the group of communication channels, wherein the control circuit simultaneously includes at least one additional communication channel to the group and remove at least one communication channel from the group, wherein the crosstalk reduction circuit calculates a second matrix after the change of composition based on a first matrix defined before the change of composition, the first matrix comprising elements characterizing crosstalk present in the group of communication channels before the change of composition and the second matrix comprising elements characterizing crosstalk present in the group of communication channels after the change of composition, wherein the crosstalk reduction circuit calculates the second matrix based on the first matrix by subtracting a third matrix based on portions of the first matrix related at least in part to at least one channel to be removed from the group of communication channels from a fourth matrix based on a portion of the first matrix related only to channels remaining in the group of communication channels.

27. The method according to claim 26, wherein a number of additional channels being included to the group is equal to a number of communication channels being removed from the group.

28. The apparatus according to claim 26, wherein the at least one communication channel being removed from the group comprises an inactive communication channel.

29. The apparatus according to claim 26, wherein the crosstalk reduction circuit partially compensates crosstalk of the group based on crosstalk reduction parameters, the apparatus further comprising:
a calculation circuit to calculate crosstalk reduction parameters after the change of composition based on crosstalk reduction parameters before the change of composition.

30. A method for crosstalk reduction, the method comprising:
reducing crosstalk of a group of communication channels electronically and based on crosstalk reduction parameters;
changing a composition of the group of communication channels, changing the composition comprising at least one step taken from the group consisting of including at least one additional communication channel to the group, removing at least one communication channel from the group and exchanging at least one communication channel of the group for at least one communication channel not in the group; and
calculating crosstalk reduction parameters after the change of composition based on crosstalk reduction parameters before the change of composition, calculating comprising calculating a second matrix after the change of composition based on a first matrix defined before the change of composition, the first matrix comprising elements characterizing crosstalk between communication channels in the group of communication channels before the change and the second matrix comprising elements characterizing crosstalk between communication channels in the group of communication channels after the change, wherein calculating the second matrix based on the first matrix comprises calculating the second matrix based on the first matrix, a third matrix describing couplings between at least one channel to be added to the group and at least one fourth matrix describing coupling between the at least one channel to be added to the group and the channels already in the group.

31. The method according to claim 30,
wherein the changing a composition of the group comprises including additional communication channels to the group,
wherein the calculating step comprises calculating the matrix $$F' = \begin{bmatrix} F'_{11} & F'_{12} \\ F'_{21} & F'_{22} \end{bmatrix}$$

after the change according to:

$F'_{22} = (H'_{22} - H'_{21}FH'_{12})^{-1}$, $F'_{21} = F'_{22}H'_{21}F$, $F'_{12} = -FH'_{12}F'_{22}$, and one of $F'_{11} = F - FH'_{12}F'_2$, and $F'_{11} = F - F'_{12}H'_{12}F$ wherein F is the matrix before the change, $H'_{22}$ is a matrix describing a coupling between the additional communication channels being included to the group,
and wherein $H'_{21}$ and $H'_{12}$ are both matrices describing a coupling between communication channels in the group before the change and communication channels being added to the group.

32. The method according to claim 30,
wherein the step of changing a composition comprises removing at least one communication channel from the group and including at least one communication channel in the group,
wherein the matrix $$F'' = \begin{bmatrix} F''_{11} & F''_{12} \\ F''_{21} & F''_{22} \end{bmatrix}$$

after the change is calculated based on a matrix $$F = \begin{bmatrix} F_{11} & F_{12} \\ F_{21} & F_{22} \end{bmatrix}$$

before the change, according to:

$$H''_{11}{}^{-1} = H_{11}{}^{-1} = F_{11} - F_{12}F_{22}{}^{-1}F_{21}$$

$$F''_{22} = (H''_{22} - H''_{21}H''_{11}{}^{-1}H''_{12})^{-1},$$

$$F''_{21} = -F''_{22}H''_{21}H''_{11}{}^{-1},$$

$$F''_{12} = -H''_{11}{}^{-1}H''_{12}F''_{22}, \text{ and one of}$$

$$F''_{11} = H''_{11}{}^{-1} - H''_{11}{}^{-1}H''_{12}F''_{21} \text{ and } F''_{11} = H''_{11}{}^{-1} - F''_{12}H''_{21}'H''_{11}{}^{-1}$$

wherein $H''_{22}$ is a matrix describing coupling between the additional communication channels added to the group, and wherein $H''_{12}$ describes a coupling between the additional communication channels added to the group and communication channels remaining in the group.

* * * * *